Patented Apr. 28, 1942

2,281,505

UNITED STATES PATENT OFFICE 2,281,505

PAVING COMPOSITION AND METHOD OF PREPARATION OF SAME

William L. Kirkland, Waban, Mass.

No Drawing. Application September 7, 1938, Serial No. 228,871

10 Claims. (Cl. 106—281)

This invention relates to an improved method of producing bituminous paving mixtures and to the mixtures produced by the use of said method.

All bituminous pavements accepted as being reasonably suitable to resist the strains imposed by modern traffic, consist of mineral particles coated with some form of bituminous cement, and compacted to form a solid integral layer upon a suitable base or foundation.

The mixtures used for such pavements are classified as coarse aggregate and fine aggregate types according to the size of the largest particles used therein: coarse aggregates being usually defined as those containing particles larger than will pass through a sieve containing ¼ inch square openings and fine aggregates being those composed of particles all of which will pass such a sieve and most of which, when dry, will pass a sieve containing 10 meshes per linear inch.

In both types, the particles are graded in size from the maximum sized particles used down to very small sized particles, and usually contain more or less particles as small as impalpable powder, these latter ordinarily being referred to as "filler," which, if not found to exist in the fine aggregate in the desired amount, may be added to the aggregate at the time of mixing same with the bituminous cement.

The coarse aggregate type mixtures are further classified in accordance with the proportion of fine aggregate particles interspersed between the coarse particles. Those mixtures in which the total aggregate contains less than 20% by weight of particles which will pass a 10 mesh sieve are ordinarily referred to as open coarse aggregate mixtures, while those containing approximately 50% of particles larger than ¼ inch and 20–40% of those which will pass a 10 mesh sieve are termed dense coarse aggregate mixtures.

While not confined to this latter class of mixtures, this invention is primarily intended to apply to the preparation of such dense coarse aggregate mixtures.

In the preparation of bituminous paving mixtures, crushed or uncrushed gravel, crushed stone or slag or mixtures of these, is ordinarily used for the coarse aggregate; while sand, fine crushed stone or slag screenings or mixtures thereof, are used for the fine aggregates, with addition of filler when needed.

The first synthetic bituminous paving mixtures were composed of mixtures of bank sand and bituminous cement. These proved unsatisfactory under traffic, because if but a small amount of bituminous cement was used, the pavements were porous and friable, while if sufficient bituminous cement were used to fill the interstices between the grains of sand and thus waterproof the mixtures, the pavements became so plastic in hot weather that they would deform or shift under traffic to an objectionable extent.

This difficulty was partially overcome by using sands which were reasonably uniformly graded from coarse to fine and by adding filler to fill the spaces remaining between the smallest sand grains and thereby assist in anchoring all the particles in their proper positions to prevent them from moving in relation to each other. The addition of such filler also permitted the use of larger percentages of bituminous cement without causing the mixture to become objectionably plastic.

Experience with such fine aggregate mixtures indicated that the pavements giving the best average results were those in which the aggregate was composed of sharp, angular grains of sand uniformly graded from those which will pass a 10 mesh sieve to those which will pass a 100 mesh sieve and be retained on a 200 mesh sieve, combined with 12 to 20% by weight of filler passing a 200 mesh sieve and then this combination, coated with sufficient bituminous cement to amount to 8–11% of the total weight of the mixture, and the use of such mixtures, or approximations of same, became standard paving practice.

The next step toward increasing the stability of bituminous pavements was the introduction of the coarse aggregate type. The idea was that if the aggregate consisted of particles properly graded in size from, say, 1½" down to and including those passing a 200 mesh screen, these would tend to interlock among themselves in the same manner as they do in a waterbound macadam road; and by coating all of such particles with an appropriate amount of bituminous cement, the resulting mixture when spread in place and compacted would possess the well-known stability of the water-bound macadam due to the interlocking of all of the particles and also the non-friable and waterproof characteristics of the prior fine aggregate type of bituminous pavements.

This was a decided improvement and these coarse aggregate types of pavements have largely superseded the fine aggregate type.

The procedure adopted in designing and preparing such mixtures has usually been to determine first by laboratory tests just what proportion of each size particles should be combined to produce an aggregate containing a minimum percentage of voids or air spaces between the particles, and then to mix such proportions of coarsest to finest particles with that proportion of bituminous cement which will coat all of the particles and approximately fill whatever small amount of voids which the laboratory test showed should remain between the particles when tested in their dry, uncoated condition.

This procedure did produce improved mixtures; however, it overlooked two important facts which prevented production of ideal mixtures.

The first fact was the assumption that when all of the particles from coarsest to finest were agitated together and coated with bituminous cement, the finer particles would find their proper positions between the coarser particles in the same manner and to the same extent as they did in the laboratory test of the dry uncoated aggregate. This assumption overlooked the fact that while in the test on the dry uncoated aggregate, the finer particles were free to move individually and thus sift into the spaces between the coarser, they could not do so when coated with bituminous cement because when the bituminous cement was added, each particle would adhere to whatever adjacent particle with which it might be in contact at that instant, irrespective of whether the particles were in the proper relative positions to give a minimum of voids or not.

The second important fact is that in order to give the best results each particle should be coated with a film of bituminous cement of that thickness which is best for that size particle, and that result cannot be obtained by the above procedure because when the bituminous cement is added to an aggregate consisting of such coarse and fine particles, the finer tend to absorb as a coating more than their appropriate share of the bituminous cement and thus leave less than a sufficient amount of bituminous cement to form a proper coating on the coarse particles. The net result produces a mixture composed of slightly separated particles insufficiently coated with bituminous cement too weakly embedded in an unduly rich and therefore undesirably plastic bituminous mortar.

As an illustration of this undesirable result, tests have shown the following: When a so-called open coarse aggregate mixture is produced by coating with bituminous cement an aggregate consisting of heated particles graded from approximately 1½ inch size to ¼ inch size, best results are obtained by using 96½ to 97% by weight of aggregate and 3 to 3⅓% of bituminous cement. Also, as previously shown, the best fine aggregate mixtures are those containing approximately 90% of aggregate passing the 10 mesh and finer sieves and 10% of bitumen.

From the above, it is obvious that in order to give the best results a mixture containing particles graded from, say, 1½ inch down to and including 200 mesh size particles, should not only contain sufficient bituminous cement to coat all the particles, but also that the bituminous cement should be divided properly between the coarse and fine particles in the above proportions. Hence, the usual procedure has been to design such dense coarse aggregate mixtures on the basis of using an amount of bituminous cement equalling 3 to 3½% of the weight of the coarse aggregate, plus 10 to 10½% of the weight of the fine aggregate.

However, if a sample be taken from such a mixture, when prepared by accepted methods, and this sample be divided into two parts, viz:

(a) Coarse aggregate retained on 10 mesh sieve plus its coating of bitumen (b) Fine aggregate passing 10 mesh sieve plus its coating of bitumen and these two portions be analyzed separately, it will be found that: The coarse aggregate portion is coated with less than 1% by weight of bitumen instead of the intended 3% and the fine aggregate portion is coated with 15% to 17% by weight of bitumen instead of the intended 10 to 10½%.

The extent to which this excess proportion of bitumen increases the thickness of the film of bitumen upon each particle of fine aggregate becomes more apparent if above analyses are expressed in proportions by volume, instead of by weight, as may be seen from the following:

*Analyses of 1,000 grams of fine aggregate mixtures in which the percentages of bitumen by weight are respectively 10½%–15%–17%*

|  | Mixture | | |
| --- | --- | --- | --- |
|  | No. 1 | No. 2 | No. 3 |
| Percentage of bitumen by weight | 10½ | 15 | 17 |
| Weight of aggregate in grams | 895 | 850 | 830 |
| Weight of bitumen in grams | 105 | 150 | 170 |
| Total weight of mixture in grams | 1,000 | 1,000 | 1,000 |
| Volume of aggregate in cubic centimeters | 337.7 | 320.75 | 313.21 |
| Volume of bitumen in cubic centimeters | 102.9 | 147.06 | 166.66 |
| Total volume mixture in cubic centimeters | 440.6 | 467.81 | 479.87 |
| Ratio of volume of bitumen to volume of aggregate | .3047 | .4585 | .5319 |
| The ratio of thickness of films of bitumen on particles of aggregate in mixtures 2 and 3 compared to thickness of films in mixture 1 are in proportion to their respective ratios of volumes of bitumen to volumes of aggregate. | | | |
| Therefore, these equal | | 1.504 | 1.745 |

In the use of paving mixtures of all types, two distinct characteristics are greatly to be desired:

First: That after the aggregate has been coated with bitumen, it shall remain relatively non-coherent until spread in place and compacted. In other words, while being transported it will not agglomerate to such an extent as to be difficult to spread; i. e., to be "unworkable."

Second: That after being compacted, it will be relatively stable under traffic, even in hot weather.

Both of these characteristics are dependent upon not only the grading of the aggregates used, but also upon the ratio of the thickness of the film on each particle to the diameter of the particle itself.

When particles of aggregate are coated with bitumen, while the actual thickness of the films on small particles is probably less than upon the coarse particles, still, due to the inherent viscosity of the bitumen, there is in all cases a minimum thickness of film; therefore, while the ratio of the thickness of film to the diameter of the particle is negligible in the case of very large particles, it is very great in the case of small particles, and if the particle is very small, the thickness of film is much greater than the diameter of the particle.

When dry, uncoated particles of various sizes are mixed together, they touch each other at only small points.

If they have been mixed with a small percentage of bitumen, the points of contact will still be small; hence, while still uncompacted, they will be so weakly cemented to each other that the mixture will remain relatively non-coherent and be easily workable, but if a much larger percentage of bitumen has been used, the thicknesses of the films being greater, the points of contact become arcs of relatively great length; and due to this greater surface area of each particle being cemented to larger areas of the surfaces of adjacent particles, they adhere together more strongly; therefore before compaction the mixture agglomerates and becomes mushy and unworkable.

As an excess thickness of film has a far more detrimental effect upon the small particles of aggregate than upon the large particles, any method of preparation which will reduce the relative thickness of film of bitumen on the smaller particles and increase that retained on the coarse particles, will increase and prolong the workability of the mixture while in an uncompacted condition.

From the above, it is obvious that while all the particles should be coated with a sufficient thickness of bitumen to strongly cement them together after being compacted, any increase in thickness of the films beyond that amount will decrease the workability of the mixture before compaction and decrease its stability after compaction due to the increased plasticity of the mortar element.

Attempts have been made to overcome this instability, and in many cases harder bituminous cements have been used than those considered ideal for other types of bituminous wearing surface, thus courting early cracking and a too brittle character for the coarse aggregate portion of the mixture.

The most efficient of these modifications has been to place in the mixer the coarse aggregate, and after coating with its appropriate quantity of bitumen, to then add the fine aggregate and its appropriate share of bitumen; then continue the mixing until an apparently uniform mixture is produced.

This modification proved to be a substantial improvement but far from a correction of the trouble, because when placed in the mixer, the fine aggregate will seize upon more or less of the bitumen coating upon the coarse particles as well as absorb the bitumen intended for it, thereby acquiring an excessive coating of bitumen.

The net result of this action tends to produce a mixture:

(a) While being transported in a heated condition in trucks will segregate—the coarse particles sinking to the bottom and the mortar composed of fine aggregate and bitumen rising to the top of the load.

(b) The mortar portion consisting of the finer particles and an excess of bitumen becoming an adhesive, mushy mass destroys the workability of the hot mixture.

(c) In the process of spreading, the coarse aggregate particles insufficiently coated with bitumen tend to be easily displaced and segregated from the mass, accumulating in pockets containing insufficient mortar.

(d) Due to this segregation and lack of uniform workability, the mixture, after being spread, is therefore non-uniform in composition, and produces a layer of wearing surface mixture which is alternately coarse and fine in spots: the coarse spots being porous due to lack of sufficient mortar between the particles, allowing easy entrance of water and early raveling or displacement, and the fine aggregate spots being unduly soft and plastic due to excess bitumen and lack of coarse particles. Thus a pavement is produced which will be easily deformed by traffic.

Another defect occurs where two courses are to be laid, the lower course being relatively dense and stable and the upper wearing course consisting of smaller coarse aggregate particles largely of one size, thus creating a larger percentage of voids between the particles and fine aggregate and bitumen, or bituminous mortar, in an amount insufficient to fill the voids, creating thereby a uniformly granular textured antiskid surface. Such pavement surfaces are short lived on account of the early stripping off of the bituminous coating by the wheels of traffic. This failure is due to the inability of present methods to produce a thick film of bitumen coating on the coarse stone particles.

The present invention preferably makes use of the above modified method of mixing but does not claim it as either novel or as an essential part of this invention.

The present invention is based upon the fact that the plasticity or liquidity, and therefore the ease with which bitumen will flow over and coat particles of aggregate, varies with the temperatures of the bitumen and the particles of aggregate. The higher the temperatures the more easily it will flow, and vice versa. It takes advantage of the fact that relatively coarse particles can be efficiently coated with bitumen at temperatures materially lower than those required when mixing finer particles with bitumen.

The method of preparation of bituminous paving mixtures covered by the present invention is, briefly, to combine warm, coarse aggregate particles with hotter fine aggregate particles of equally dense non-porous character and hot liquid bitumen in any suitable form of mixer or by hand mixing, if latter is desired.

It has been found that best results and the least subsequent segregation are obtained if at the time of mixing, the coarse aggregate particles, larger than will pass a 10 mesh screen, are at a temperature at least 15° F. below the temperature of the fine aggregate particles which will pass a 10 mesh and finer screens.

The exact temperatures of all the ingredients must of course be sufficiently high to permit efficient coating of all the particles and also produce a complete mixture which will after transportation to the street or road be at a temperature which will permit it to be easily spread and efficiently compacted; therefore, no exact temperatures can be specified as these must vary with the consistency of the bitumen used, the state of the weather, and the length of time in transit to street or road.

In the past, it has been found that to produce the above results with dense coarse aggregate mixtures with bitumen as ordinarily used of approximately 50–60 penetration, the mixtures at the time of leaving the mixing plant should be at a temperature of at least 275° F. and preferably at 300° F., therefore, in order to allow for the cooling which takes place when the ingredients are being agitated in the mixer, both coarse and fine aggregates at the time of being placed in the mixer have been ordinarily at approximately 330° F. or higher, and the bitumen at 300°–325° F.

The above practice of using both coarse and fine aggregates at the temperature required for proper coating of the fine particles causes use of coarse aggregate at a temperature higher than that at which they will retain a proper thickness of bitumen coating; hence, they will release more or less of this bitumen to the fine particles. However, if the coarse particles are cooler than the bitumen and cooler than the fine particles, the bitumen will, when it strikes the coarse particles, be slightly cooled and therefore become more viscous and remain thereon in a thicker film.

The present method, therefore, provides combining the ingredients at such temperatures as will produce mixtures which will be easily workable when spread upon the street, but to use all or a substantial part of the coarse aggregate at a temperature at least 15° F. lower than the temperature found necessary for the fine aggregate to give above result.

The coarse and fine aggregates may be introduced into the mixer together and then be coated with bitumen or, as is preferred, the coarse aggregate may be placed in the mixer and after this has been coated with an appropriate amount of bitumen, the fine aggregate and the remaining desired quantity of bitumen be added and the mixing be continued. If filler is needed, this may be added to the bitumen coated coarse aggregate before or after addition of the fine aggregate and the remaining bitumen. The filler may be used at air temperature or heated as may be desired.

In practice, to secure the desired gradation of coarse to fine particles, it may be necessary to combine several sizes of commercial coarse aggregates and one or more sands or crusher screenings. Further, in order to subdivide the aggregate into at least two sizes for combination in the mixer in accordance with this invention, several methods of heating and separating or screening may be employed in which it may be practical to heat some of the smaller particles of coarse aggregate along with and to the same temperatures as the fine aggregate. Often aggregates must be used which contain both coarse and fine particles and it may be impractical to subdivide same before heating. Therefore, it is not intended to limit the scope of this invention by requiring that all the particles of coarse aggregate be cooler than the fine aggregate even though it be desirable.

I have found that to produce mixture of the desired character and composition, at least 25% by weight of the total mineral aggregate consisting of particles all of which are retained on the 10 mesh sieve, should have a temperature of at least 15° F. below that of the fine aggregate.

Having thus described my invention and the reasons for the use of same, what I claim is:

1. The method of preparing a bituminous paving mixture which consists of combining in predetermined proportions, coarse aggregate mineral particles larger than will pass a screen having ten meshes per linear inch and equally dense fine aggregate mineral particles which will pass a ten mesh screen with bituminous cement, all of same being heated to temperatures sufficient to produce a complete mixture which will be easily workable after transportation to point of use; the coarse aggregate particles in the amount of at least 25% of the total aggregate at the time of combining, being at a temperature at least 15° F. cooler than the temperature of the fine aggregate.

2. The method of preparing a bituminous paving mixture which consists of combining in predetermined proportions, coarse aggregate mineral particles larger than will pass a screen having ten meshes per linear inch and equally non-porous fine aggregate mineral particles which will pass a ten mesh screen with bituminous cement all of same being heated to temperatures sufficient to produce a complete mixture which will be easily workable for a period of at least three hours after time of mixing, the coarse aggregate particles in the amount of at least 25 per cent of the total aggregate at time of combining, being at a temperature at least 15° F. cooler than the temperature of the fine aggregate.

3. The method of preparing bituminous paving mixtures of the coarse aggregate type which consists of heating the mineral particles used therein which are substantially non-absorbent in character, then separating them into portions which respectively will and will not pass a screen having ten meshes per linear inch and recombining these portions in predetermined proportions with heated bituminous cement, each of these ingredients being at such temperatures as will produce a complete mixture which will be easily workable after transportation to point of use; the method being further characterized by the fact that at the time of combining these ingredients, sufficient of the particles which will not pass a ten mesh screen to equal at least 25 per cent of the weight of the total aggregate shall be at a temperature of at least 15° F. cooler than the temperature of those particles which will pass a ten mesh screen.

4. The method of preparing bituminous paving mixtures of the coarse aggregate type which consists of heating the mineral particles used therein which are substantially non-absorbent in character, then separating them into portions which respectively will and will not pass a screen having ten meshes per linear inch and recombining these portions in predetermined proportions with heated bituminous cement, each of these ingredients being at such temperature as will produce a complete mixture which will be easily workable for a period of at least three hours after time of combining; the method being further characterized by the fact that at the time of combining these ingredients, sufficient of the particles which will not pass a ten mesh screen to equal at least 25 per cent of the weight of the total aggregate shall be at a temperature of at least 15° F. cooler than the temperature of those particles which will pass a ten mesh screen.

5. A method of preparing bituminous paving mixtures of the coarse aggregate type which comprises mixing together, in predetermined proportions, bituminous cement in a heated liquid condition, with heated mineral particles all of which are substantially non-porous in character and at least fifty percent of which are larger than will pass a ten mesh screen and not less than eighteen percent of which will pass a ten mesh screen; the method being further characterized by the fact that at least enough of the particles larger than ten mesh size to equal at least twenty-five percent of the weight of all the particles used shall, at the time of mixing, be at a temperature of at least 15° F. below the temperature of the remainder of the particles.

6. A method of preparing bituminous paving mixtures of the coarse aggregate type, composed of coarse aggregate consisting of mineral particles coarser than will pass a 4 mesh sieve and of fine aggregate of substantially equal hardness and density consisting of mineral particles all of which will pass a 4 mesh sieve and most of which will pass a 10 mesh sieve and of heated bituminous cement, the method being characterized by the heating of the coarse aggregate separately from the fine aggregate and later combining in predetermined proportions the coarse aggregate, fine aggregate and bituminous cement, and being further characterized by the coarse aggregate being at a temperature of at least 15° F. cooler than the temperature of the fine aggregate at the time these are combined with the bituminous cement.

7. A method of preparing bituminous paving mixtures of the coarse aggregate type, composed of durable non-absorbent coarse aggregate consisting of mineral particles coarser than will pass a 4 mesh sieve and of fine aggregate of equal absorbing character consisting of mineral particles all of which will pass a 4 mesh sieve and most of which will pass a 10 mesh sieve and of heated bituminous cement, the method being characterized by separately heating the coarse and fine aggregates and later combining in predetermined proportions the coarse aggregate, fine aggregate and bituminous cement; and being further characterized by the fact that at the time of combination, sufficient of the coarse aggregate to equal at least 25 per cent of the weight of the mixture shall be at a temperature of at least 15° F. cooler than the temperature of the fine aggregate.

8. A method of preparing bituminous paving mixtures of the coarse aggregate type, which comprises the steps of coating a predetermined proportion of heated mineral particles coarser than will pass a 4 mesh sieve with a predetermined proportion of heated bituminous cement and then mixing therewith a predetermined proportion of heated non-porous mineral particles, all of which will pass a 4 mesh sieve and most of which will pass a 10 mesh sieve, and an additional predetermined proportion of heated bituminous cement, the method being further characterized by the fact that at the time of mixing, an amount of the particles coarser than 4 mesh sufficient to equal at least 25 per cent of the weight of the complete mixture shall be at a temperature at least 15° F. cooler than the temperature of the particles which will pass a 4 mesh sieve.

9. In the preparation of a dense coarse aggregate bituminous paving composition to be laid hot, the herein described process which comprises preparing a mixture containing coarse mineral aggregate and fine mineral aggregate, both of a substantially non-porous character, said coarse material and fine material both being in a heated condition, but a large part at least of said coarse aggregate being at least 15° F. cooler than said fine aggregate, and mixing hot bituminous binder with said mixture, said bituminous binder when added being at a higher temperature than said mineral aggregate, whereby said coarse aggregate chills the binder coming upon its surface to a greater extent than does said fine aggregate, to retain upon the surface of said coarse aggregate a larger proportion of said binder than would be the case if the coarse aggregate and fine aggregate were at the same temperature when the binder is mixed therewith, the amount of said coarse aggregate being at least 25% of the total mineral aggregate.

10. In the preparation of a dense coarse aggregate bituminous paving composition to be laid hot, the herein described process which comprises preparing a mixture containing coarse mineral aggregate of a substantially non-porous character and a heated bituminous cement, and adding fine mineral aggregate also of a substantially non-porous character, said coarse material and fine material both being in a heated condition, but a large part at least of said coarse aggregate being at least 15° F. cooler, when said bituminous cement is added to it, than said fine aggregate when said bituminous cement is added to it, both of said amounts of said bituminous binder when added, being at a higher temperature than said mineral aggregate, whereby said coarse aggregate chills the binder coming upon its surface to a greater extent than does said fine aggregate, to retain upon the surface of said coarse aggregate in the final mixture, a larger proportion of said binder than would be the case if the coarse aggregate and fine aggregate were at the same temperature when the binder is mixed therewith, the amount of said coarse aggregate being at least 25% of the total mineral aggregate.

WILLIAM L. KIRKLAND.